F. S. DAVENPORT.
Gang Plow.
No. 41,491. Patented Feb. 9, 1864.
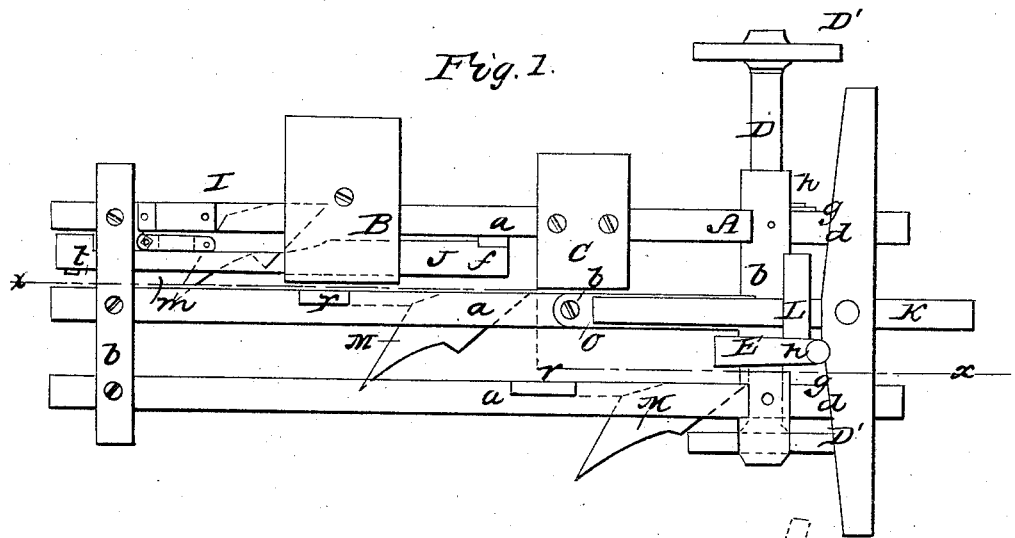
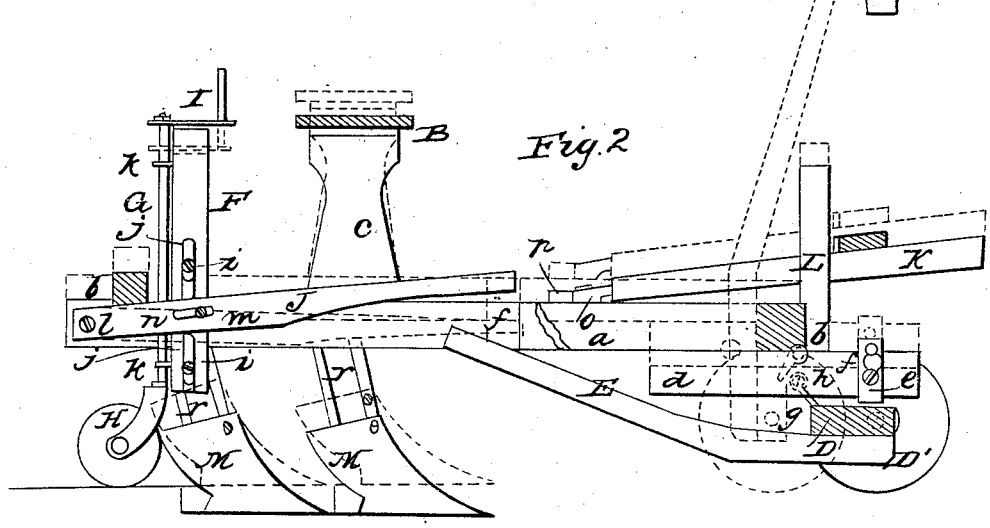
Witnesses
J. W. Coombs
Geo. W. Reed
Inventor
F. S. Davenport
per Munn & Co
Attorneys

UNITED STATES PATENT OFFICE.

F. S. DAVENPORT, OF JERSEYVILLE, ILLINOIS.

IMPROVEMENT IN GANG-PLOWS.

Specification forming part of Letters Patent No. 41,491, dated February 9, 1864.

*To all whom it may concern:*

Be it known that I, F. S. DAVENPORT, of Jerseyville, in the county of Jersey and State of Illinois, have invented a new and Improved Gang-Plow; and I do hereby declare that the following is a full, clear, and exact description of the same, reference being had to the accompanying drawings, making a part of this specification, in which—

Figure 1 is a plan or top view of my invention; Fig. 2, a side sectional view of my invention, taken in the line *x x*, Fig. 1.

Similar letters of reference indicate corresponding parts in the two figures.

This invention consists in a novel and improved means for gaging the depth of the penetration of the plows into the earth and for raising them out of the earth when designed to be inoperative.

The invention also consists in a novel and improved means for guiding the machine and turning it at the ends of the furrows, as hereinafter fully set forth.

To enable those skilled in the art to fully understand and construct my invention, I will proceed to describe it.

A represents a horizontal frame, which may be constructed of three parallel bars, *a*, connected near their front and back ends by crossbars *b*.

B represents the driver's seat, which is attached to an upright, *c*, at one side of the frame A; and C is a foot-piece for the driver, attached to said frame directly in front of the seat B.

To each side of the frame A, at its front end, there is attached a short bar, *d*, said bars projecting beyond the front end of the frame and having each a vertical bar or stop, *e*, attached by a screw, *f*. Each of these stops may have two or more screw-holes made in them to admit of being adjusted higher or lower, as may be required.

D is an axle-tree, which is at the under side of the bars *d d*, and is attached thereto by rods *g*, which work on bolts *h*, driven in the bars *d*, and admit of the axle-tree D being adjusted in an upright or horizontal position, as may be required, and as shown in Fig. 2, the horizontal position being shown in brown tint and the upright position in red outline. The axle-tree is thus adjusted by a lever, E, attached to it. D' D' are the wheels of the axle-tree D.

To the back part of the frame A, at one side of it, there is attached a vertical sliding bar, F, which may be retained in proper position by screws or bolts *i*, passing through vertical slots *j* in the bar F and into parts attached to the frame A. The length of the slots *j* is such as to admit of a requisite length of vertical movement of the bar F. To this bar F there are attached two bearings, *k k*, in which a vertical shaft, G, is fitted and allowed to turn freely. This shaft G has a caster-wheel, H, at its lower end, and at its upper end there is a crank, I.

J is a lever, the fulcrum-pin *l* of which passes through the outer end of the lever into the frame A. The bar F is attached to the lever J by a screw or pin, *m*, which passes through a longitudinal slot, *n*, in the lever and into the bar. (See Fig. 2.)

K is the draft-pole, the back end of which has an eye, *o*, attached to it, through which a screw or bolt, *p*, passes into the frame A, the eye *o* being allowed to turn freely on the screw or bolt *p*. The draft-pole passes through a yoke or guide, L, which is attached to the front end of the frame A by screws, and may be adjusted at a greater or less distance to the right or left of the center of the frame A, so as to vary the line of draft in the same way as may be done by the adjustment of an ordinary plow-clevis.

To the frame A there are attached a number of inclined plow-standards, *r*, having plows M attached to their lower ends. These plows are of narrow gage and are placed one slightly in advance of the other and in an oblique line, like those of other gang-plows.

From the above description it will be seen that as the machine is drawn along and the plows M at work or in the ground the axle-tree D will be in a horizontal position, or nearly so, with its front edge bearing against the stops *e e*, and as these stops may be adjusted higher or lower, it will be seen that the depth of the penetration of the plows may be graduated as desired.

In order to raise the plows M above the surface of the ground with a view of moving the machine from place to place, the axle-tree D is turned to an upright position and the lever J forced down by the foot of the driver, so as to catch under a stop, *f*, on the frame A, as shown in red in Fig. 2; and in order to turn the machine at the ends of furrows, the shaft G of the caster-wheel is turned, which causes the machine, when the plows are elevated, to be swung around in a proper position for starting again.

The front wheels, it will be seen, run on hard or unplowed ground and the caster-wheel H runs on the bottom of the furrow made by the back plow.

Having thus described my invention, what I claim as new, and desire to secure by Letters Patent, is—

1. The hinged or swinging axle-tree D, attached to the frame A, as shown, in connection with the adjustable stops $e\ e$, as and for the purpose herein set forth.

2. The caster-wheel H, attached to the shaft G, which is connected to the sliding bar F, having a lever, J, attached, when said parts are used in combination with the swinging axle-tree D, as and for the purpose specified.

F. S. DAVENPORT.

Witnesses:
  I. HARBERT,
  S. L. McGILL.